United States Patent
Ayatollahi

(10) Patent No.: US 8,761,847 B2
(45) Date of Patent: *Jun. 24, 2014

(54) MOBILE WIRELESS COMMUNICATIONS DEVICE HAVING AN ANTENNA ASSEMBLY WITH CORNER COUPLED RECTANGULAR BASE CONDUCTOR PORTIONS AND RELATED METHODS

(71) Applicant: Research in Motion Limited, Waterloo (CA)

(72) Inventor: Mina Ayatollahi, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/869,278

(22) Filed: Apr. 24, 2013

(65) Prior Publication Data

US 2013/0237295 A1 Sep. 12, 2013

Related U.S. Application Data

(63) Continuation of application No. 13/114,476, filed on May 24, 2011, now Pat. No. 8,457,699.

(51) Int. Cl.
*H04M 1/00* (2006.01)

(52) U.S. Cl.
USPC ............... 455/575.7; 455/575.1; 343/700 MS

(58) Field of Classification Search
None
See application file for complete search history.

(56) References Cited

U.S. PATENT DOCUMENTS

| | | | |
|---|---|---|---|
| 6,850,192 B2 | 2/2005 | Yeh | |
| 7,023,386 B2 | 4/2006 | Habib et al. | |
| 7,161,540 B1 | 1/2007 | Liu | |
| 7,612,734 B2 | 11/2009 | Tsai et al. | |
| 7,808,438 B2 | 10/2010 | Schlub et al. | |
| 8,457,699 B2 * | 6/2013 | Ayatollahi | ................ 455/575.7 |
| 2008/0129637 A1 | 6/2008 | Chi et al. | |

FOREIGN PATENT DOCUMENTS

| | | |
|---|---|---|
| EP | 1094542 | 4/2001 |
| JP | 10093332 | 4/1998 |
| JP | 2003158419 | 5/2003 |

OTHER PUBLICATIONS

Ferrando-Bataller et al., "Overview of Planar Monopole Antennas for UWB Applications", Oct. 2006, pp. 1-6.
Jilkova et al., "Ultra-Wideband Coplanar-Fed Monopoles: A Comparative Study", Apr. 2007, pp. 37-42.

(Continued)

*Primary Examiner* — Erika A Washington
(74) *Attorney, Agent, or Firm* — Allen, Dyer, Doppelt, Milbrath & Gilchrist, P.A.

(57) ABSTRACT

A mobile wireless communications device may include a portable housing, a substrate carried by the portable housing, and wireless communications circuitry carried by the substrate. The mobile wireless communications device may also include at least one an antenna assembly carried by the substrate and coupled to the wireless communications circuitry. The at least one antenna assembly may include an electrically conductive base conductor having a first rectangular base portion and a second rectangular base portion offset therefrom. The first and second base portions may be coupled at respective diagonally opposing corners thereof and having an antenna feed defined along an outer portion of one of the first and second rectangular base portions. The at least one antenna assembly may include at least one electrically conductive arm extending along at least one side of one of the first and second rectangular base portions and spaced apart therefrom.

19 Claims, 8 Drawing Sheets

(56) References Cited

OTHER PUBLICATIONS

Lee et al., "A Study of Printed Monopole Antenna for Ultra Wideband Systems", 2006, pp. 1-4.

Mandeep et al., "Design of a Dual Monopole Antenna With Wideband Frequency", Progress in Electromagnetics Research C, vol. 3, 2008, pp. 119-128.

* cited by examiner

… (1) …

MOBILE WIRELESS COMMUNICATIONS DEVICE HAVING AN ANTENNA ASSEMBLY WITH CORNER COUPLED RECTANGULAR BASE CONDUCTOR PORTIONS AND RELATED METHODS

TECHNICAL FIELD

The present disclosure generally relates to the field of wireless communications systems, and, more particularly, to mobile wireless communications devices and related methods.

BACKGROUND

Mobile wireless communications systems continue to grow in popularity and have become an integral part of both personal and business communications. For example, cellular telephones allow users to place and receive voice calls almost anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. One challenge this poses for cellular device manufacturers is designing antennas that provide desired operating characteristics within the relatively limited amount of space available for antennas.

DETAILED DESCRIPTION

Figure 1:
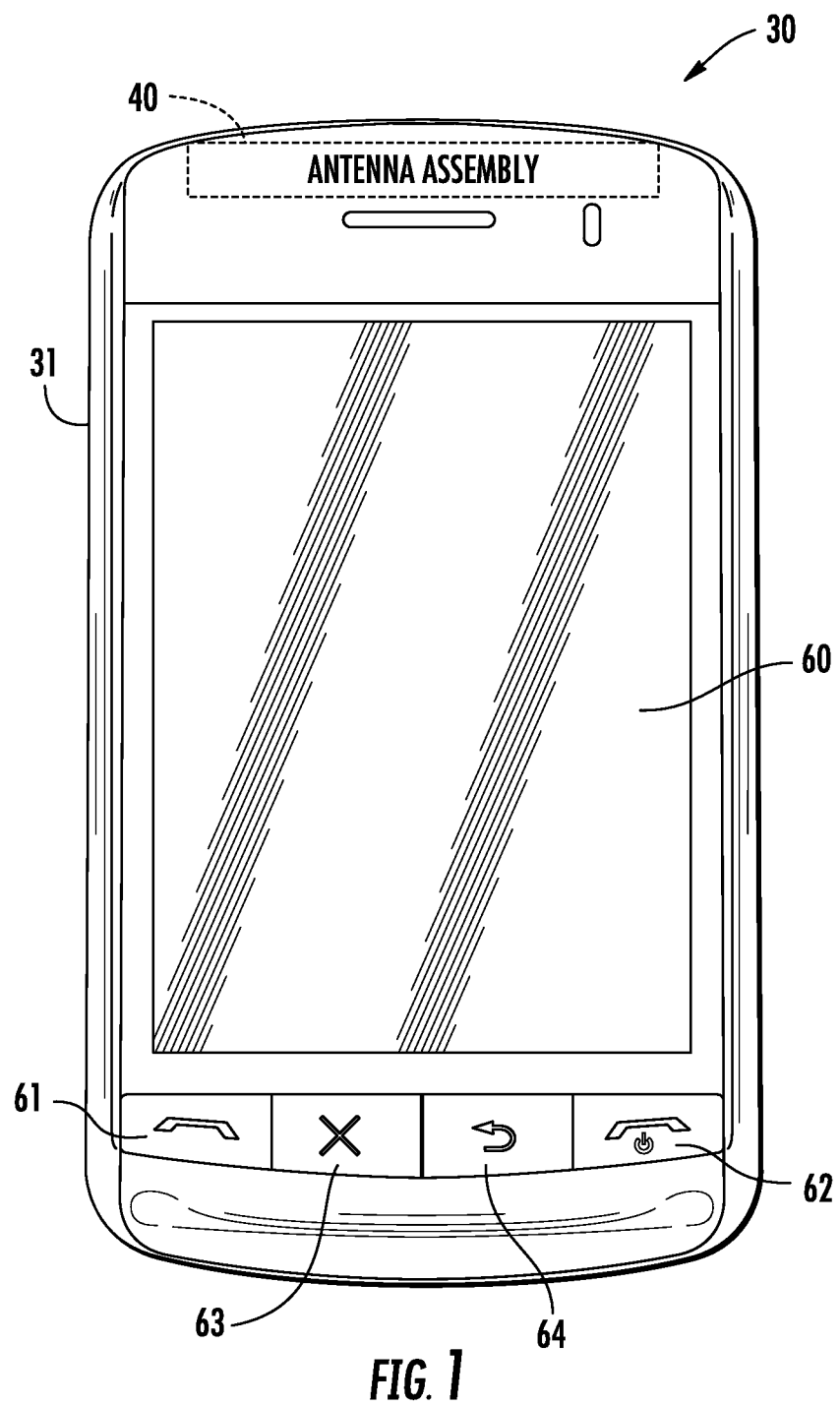
FIG. 1 is a top plan view of a mobile wireless communications device including an antenna assembly in accordance with one example embodiment.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

In accordance with one exemplary aspect, a mobile wireless communications device may include a portable housing, a substrate carried by the portable housing, and wireless communications circuitry carried by the substrate. The mobile wireless communications device may also include at least one an antenna assembly carried by the substrate and coupled to the wireless communications circuitry. The at least one antenna assembly may include an electrically conductive base conductor having a first rectangular base portion and a second rectangular base portion offset therefrom. The first and second base portions may be coupled at respective diagonally opposing corners thereof and having an antenna feed defined on one of the first and second rectangular base portions. The at least one antenna assembly may include at least one electrically conductive arm extending along at least one side of one of the first and second rectangular base portions and spaced apart therefrom.

The at least one electrically conductive arm may include an L-shaped conductive arm. The at least one electrically conductive arm may be coupled to at least one of the first and second rectangular base portions, for example.

The at least one electrically conductive arm may also include at least one electrically floating conductive arm, for example. The at least one electrically conductive arm may include first and second electrically conductive arms adjacent the first and second rectangular base portions, respectively, for example. The at least one electrically conductive arm may extend along at least two sides of an adjacent one of the first and second rectangular base portions.

The substrate may include a dielectric layer and a conductive layer carried by the dielectric layer and define a ground plane, for example. The at least one antenna assembly may be above the ground plane. The at least one antenna assembly may include a plurality of spaced apart antenna assemblies.

A method aspect is directed to a method of making a mobile wireless communications device that may include a portable housing, a substrate carried by the portable housing, and wireless communications circuitry carried by the substrate. The method may include forming at least one antenna assembly on the substrate and coupled to the wireless communications circuitry. The antenna assembly may be formed by at least forming an electrically conductive base conductor comprising a first rectangular base portion and a second rectangular base portion offset therefrom. The first and second base portions may be coupled at respective diagonally opposing corners thereof and may have an antenna feed defined on one of the first and second rectangular base portions, for example. Forming the at least one antenna assembly may also include forming at least one electrically conductive arm extending along at least one side of one of the first and second rectangular base portions and spaced apart therefrom.

Figure 2:
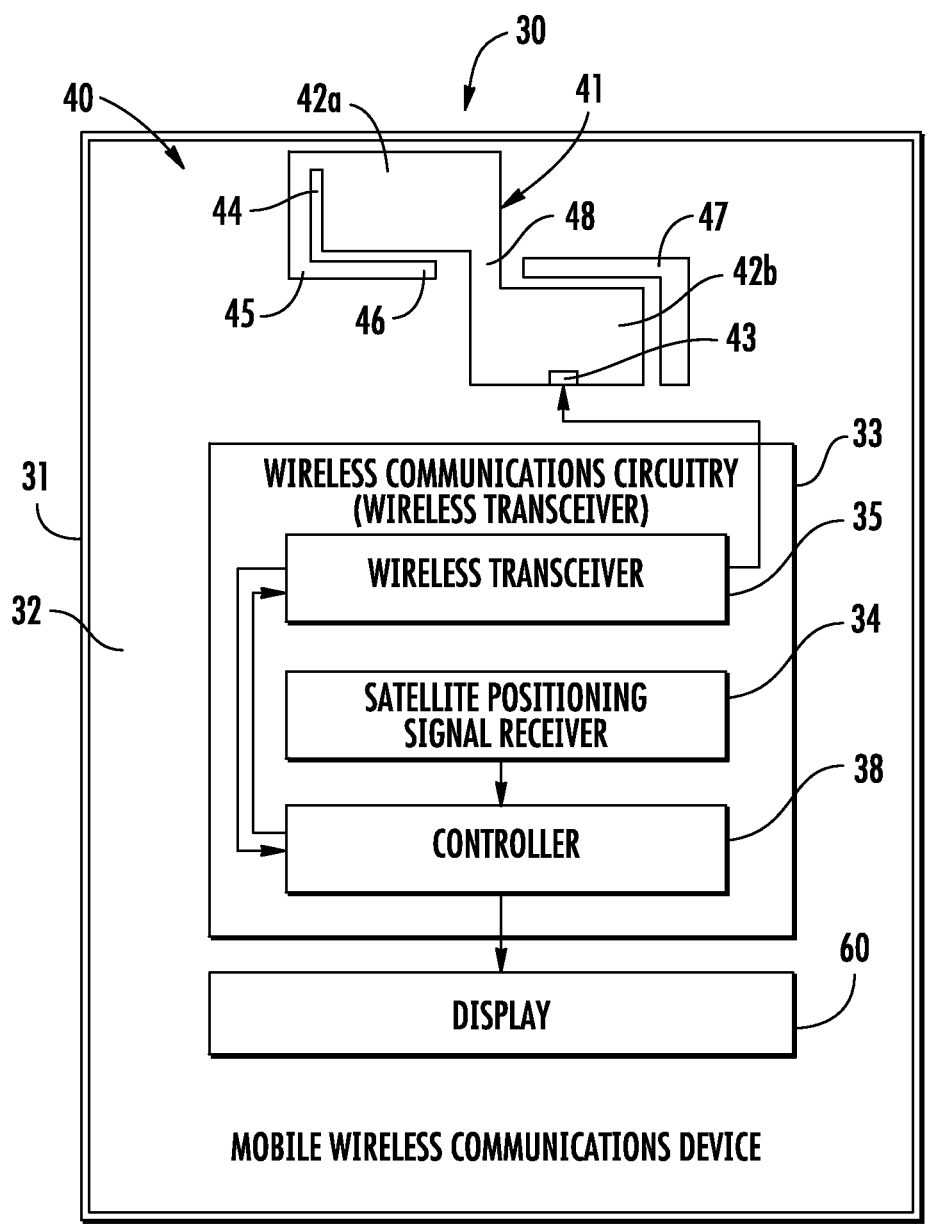
FIG. 2 is a schematic block diagram of the device of FIG. 1.
Figure 3:
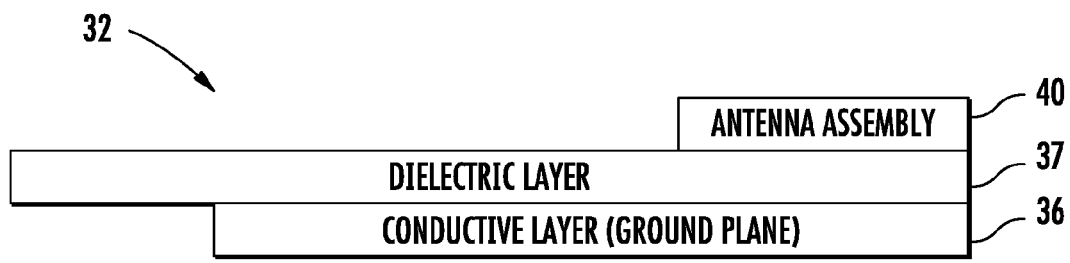
FIG. 3 is a side schematic view of the substrate of the device of FIG. 1.

Referring initially to FIGS. 1-3, a mobile wireless communications device 30 illustratively includes a housing 31 and a substrate 32, for example, a printed circuit board (PCB) carried by the housing. The housing 31 has an upper portion and a lower portion. The substrate 32 may be a rigid PCB, or may be a flexible substrate or PCB, for example. In some embodiments wherein a PCB is used, the PCB may be replaced by or used in conjunction with a metal chassis or other substrate, as will be appreciated by those skilled in the art and described in further detail below. The substrate 32 includes a conductive layer 36 defining the ground plane (FIG. 3). The substrate 32 also includes a dielectric layer 37 carrying the conductive layer 36. The substrate 32 may have additional layers, as will be appreciated by those skilled in the art. The dielectric layer 37 has a dielectric constant of 2.25 and dimensions of 40 mm×100 mm. Of course, the dielectric layer 37 may have another value dielectric constant and other dimensions. The ground plane or conductive layer 36 is carried by one side of the dielectric layer 37 and has a smaller dimension than the dielectric layer, for example, 40 mm×80 mm. Of course, the conductive layer 36 may have a different dimension, for example, a same dimension as the dielectric layer 37.

Wireless communications circuitry 33 is carried by the portable housing 31. The wireless communications circuitry 33 may include, for example, a wireless transceiver 35. The wireless communications circuitry 33 may also include, in some embodiments, a satellite positioning signal receiver 34. The satellite positioning signal receiver 34 may be a Global Positioning System (GPS) satellite receiver, for example. Of course, the mobile wireless communications device 30 may not include a satellite positioning receiver, or may include additional receivers and/or transmitters, for example, near-field communications (NFC) receivers and/or transmitters and wireless local area network receivers (e.g. 802.xx, WiFi, WiMax). The satellite positioning receiver 34 or other or additional receivers and/or transmitters may not be part of the wireless communications circuitry 33, as will be appreciated by those skilled in the art.

The exemplary device 30 further illustratively includes a display 60 and a plurality of control keys including an "off hook" (i.e., initiate phone call) key 61, an "on hook" (i.e., discontinue phone call) key 62, a menu key 63, and a return or escape key 64. Operation of the various device components and input keys, etc., will be described further below with reference to FIG. 8.

The device 30 further illustratively includes an antenna assembly 40 carried by the substrate 32 and coupled to the wireless communications circuitry 33. The antenna assembly 40 is illustratively carried by an upper portion of the portable housing 31. Of course, the antenna assembly may be carried elsewhere in the portable housing 31. The antenna assembly 40 may also be positioned vertically with respect to the substrate 32.

The antenna assembly 40 is a monopole antenna, and spaced above the ground plane or conductive layer 36. The dielectric layer 37 carries the antenna assembly 40 on one side and the conductive layer 36 on an opposing side (FIG. 3). Alternatively, the antenna assembly 40 may be carried on the same side or surface of the dielectric layer 37 as the conductive layer 36, for example. The antenna assembly 40 may be carried elsewhere by the substrate 32. The antenna assembly 40 may be vertically or horizontally oriented with respect to the conductive layer 36.

The antenna assembly 40 includes an electrically conductive base conductor 41. The electrically conductive base conductor 41 includes a first rectangular base portion 42a and a second rectangular base portion 42b offset from the first rectangular base portion. The first and second base portions 42 are coupled at respective diagonally opposing corners thereof 48 and define the main radiating element.

An antenna feed point 43 is defined on the second rectangular base portion 42b. Of course, the antenna feed point 43 may be defined on any one of the first and second rectangular base portions 42. As will be appreciated by those skilled in the art, positioning or defining the feed point 43 along another portion of either of the first and second rectangular base portions 42 may result in polarization diversity or change in other antenna characteristics, such as, resonance frequency, bandwidth, and gain. For example, if the antenna assembly 40 is rotated 180 degrees and the antenna feed point 43 is defined on the first base portion 42a, the polarization of the radiated field would be orthogonal compared to the radiated field of the antenna assembly without rotation.

A first L-shaped base conductor arm 45 is coupled to the first rectangular base portion 42a at a corner diagonally opposing the corner coupled to the second rectangular base portion 42b. The first L-shaped conductor 45 arm being coupled to the first rectangular base portion 42a defines an L-shaped opening 44. Illustratively, the first L-shaped base conductor arm 45 extends along two sides of the first rectangular base portion 42a, and has an end 46 adjacent the coupled diagonally opposing corners 48. The first L-shaped base conductor arm 45 advantageously may contribute to the increased bandwidth of the antenna assembly 40, for example, from 3 GHz to 9 GHz. The first L-shaped base conductor arm 45 also may provide additional resonance to the antenna assembly 40.

The antenna assembly 40 also illustratively includes a second L-shaped electrically conductive arm 47 that is adjacent the second rectangular base portion 42b. The second L-shaped electrically conductive arm 47 is electromagnetically coupled to the second rectangular base portion 42b. The second L-shaped electrically conductive arm 47 is spaced apart from the second rectangular base portion 42b, i.e. it is electrically floating. The second L-shaped electrically floating conductive arm 47 extends along a side of the second rectangular base portion 42b from a corner thereof that is diagonally opposing the corner coupled to the first rectangular base conductor 42a. The second L-shaped electrically floating conductive arm 47 extends along another side of the second rectangular base portion 42b to adjacent the diagonally opposing coupled corners 48. The second L-shaped electrically floating conductive arm 47 advantageously may also contribute to the increased bandwidth of the antenna assembly 40, for example, from 3 GHz to 9 GHz. The second L-shaped electrically floating conductive arm 47 also may provide additional resonance to the antenna assembly 40.

While the antenna assembly 40 illustratively includes the first L-shaped conductor arm 45 and the second L-shaped electrically floating conductive arm 47, it will be appreciated by those skilled in the art that the antenna assembly may include either of the first and second L-shaped conductor arms. Moreover, each of the L-shaped conductor arms 45, 47 may be positioned or oriented in another configuration.

The wireless communications circuitry 33 may also include a controller 38 or processor. The controller 38 may cooperate with the other components, for example, the antenna assembly 40, the satellite positioning signal receiver 34, and the wireless transceiver 33 to coordinate and control operations of the mobile wireless communications device 30. Operations may include mobile voice and data operations, including email and Internet data.

The overall size of the antenna assembly 40 may be 12 mm×10 mm, for example. The antenna assembly 40 may be other sizes. The antenna assembly 40 as will be appreciated by those skilled in the art, also has an omni-directional radiation pattern, increased efficiency, and increased constant gain for a relatively large bandwidth that may include the WiMax band, for example. In other words, the antenna assembly 40 advantageously provides nearly constant gain and increased radiation efficiency in the operating frequency band, for example. More particularly, the main lobe direction of the antenna assembly 40 is theta=135 degrees, and phi=90 degrees, while if the antenna assembly is rotated 180 degrees, as noted above, the main lobe direction is theta=40 degrees, and phi=0 degrees.

Figure 4:
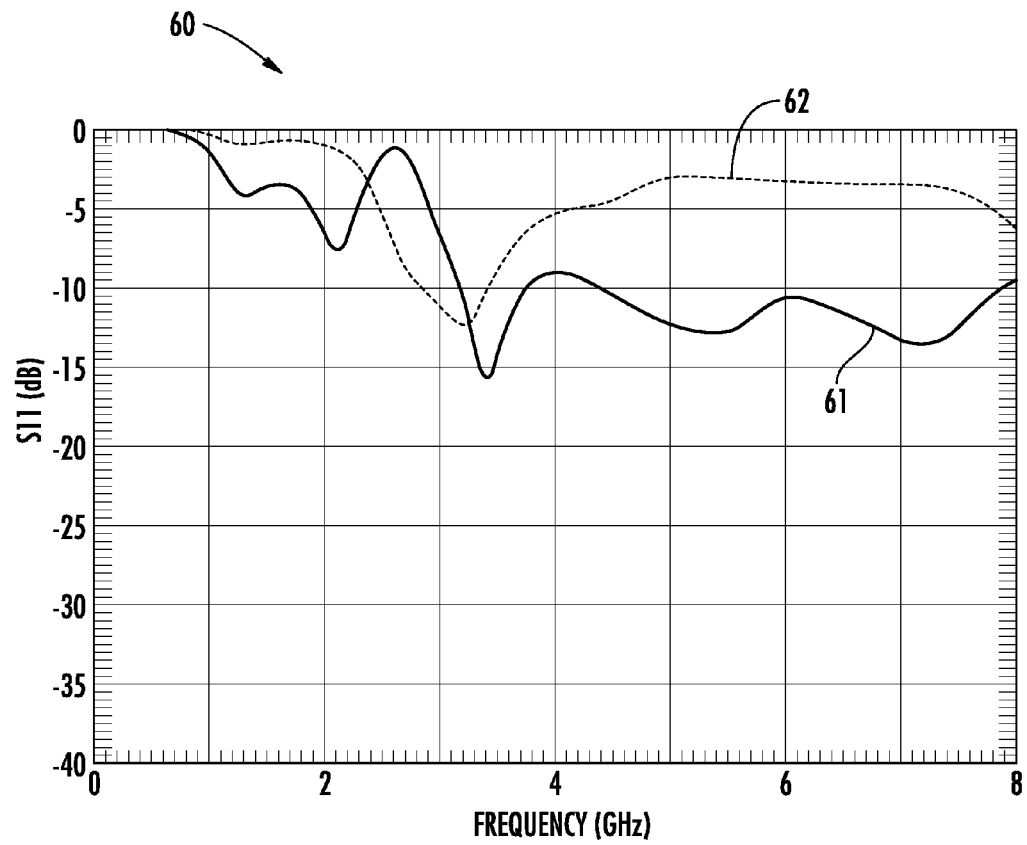
FIG. 4 is a graph of simulated S-parameters for the antenna assembly of FIG. 2.

Referring now additionally to the graph 60 in FIG. 4, a simulated S parameter plot is illustrated. The simulated S parameter 61 of an antenna assembly similar to the antenna assembly 40 in FIG. 2 and described above is graphed versus frequency. The simulated S parameter 62 for an antenna assembly without both L-shaped conductive arms 45, 47 is also illustrated. As illustrated in the graph 60, the L-shaped electrically conductive arms 45, 47, advantageously provide additional resonance to the antenna assembly 40 and may increase bandwidth at least by a factor of 7.

Figure 5A:
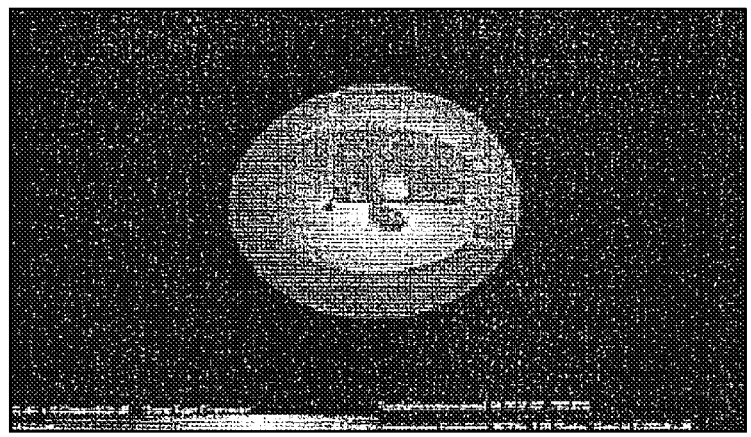
FIGS. 5*a*-5*c* are graphs of simulated gain for the antenna assembly of FIG. 2 at a frequency of 3.2 GHz.
Figure 5B:
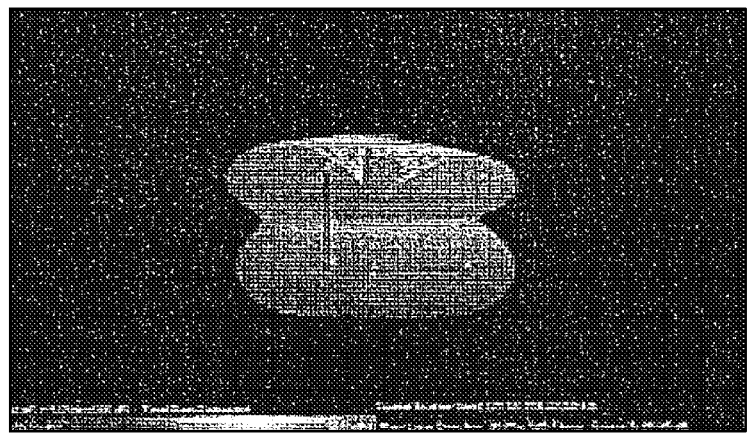
Figure 5C:
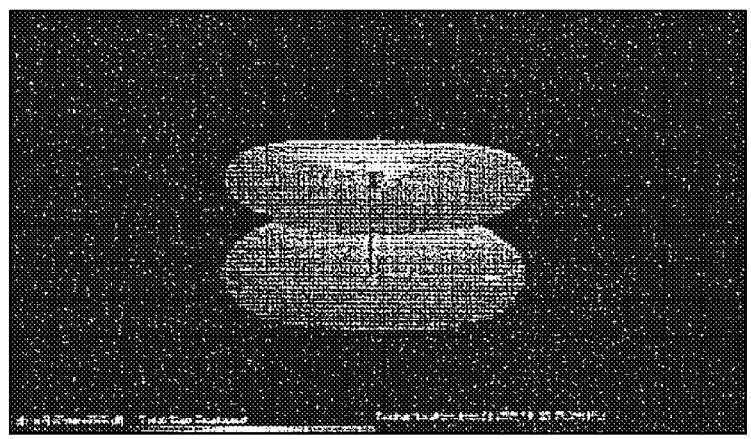

Referring now to the graphs 63, 64, and 65 in FIGS. 5a-5c, simulated radiation patterns for an antenna assembly similar to the antenna assembly 40 are illustrated. The graphs 63, 64, 65 illustrate the radiation patterns at the frequency of 3.2 GHz. Graph 63 illustrates the gain in the X-Y plane (FIG. 5a). Graph 64 illustrates the gain in the X-Z plane (FIG. 5b). Graph 65 illustrated the gain in the Y-Z plane (FIG. 5c). The Z axis is along the length of the substrate 32, the X axis is along the width, and the Y axis is along the thickness. The gain is about 5.1 dB at the frequency of 3.2 GHz.

Figure 6A:
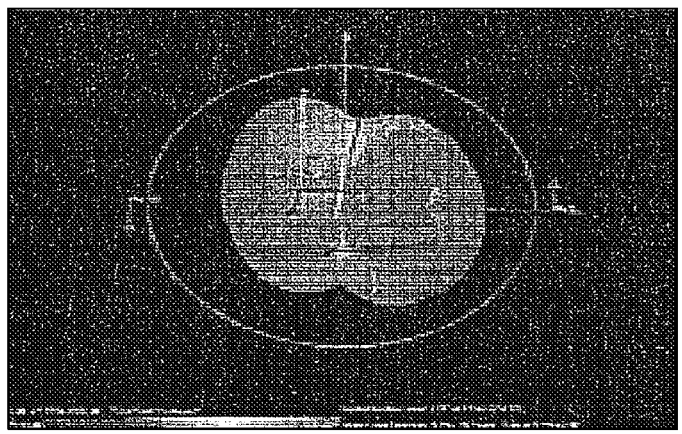
FIGS. 6*a*-6*c* are graphs of simulated gain for the antenna assembly of FIG. 2 at a frequency of 7.3 GHz.
Figure 6B:
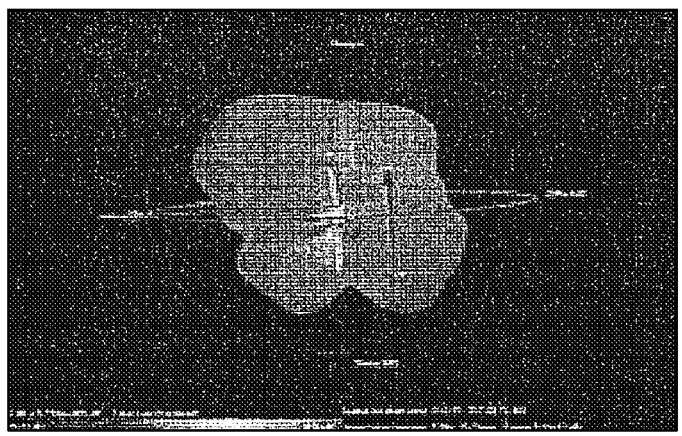
Figure 6C:
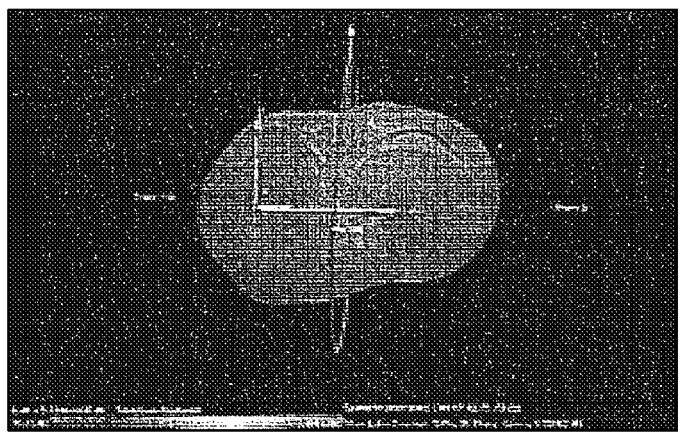

Referring now to the graphs 66, 67, and 68 in FIGS. 6a-6c, simulated radiation patterns for an antenna assembly similar to the antenna assembly 40 are illustrated. The graphs 66, 67, 68 illustrate the radiation patterns at the frequency of 7.3 GHz. Graph 66 illustrates the gain in the X-Y plane (FIG. 6a). Graph 67 illustrates the gain in the X-Z plane (FIG. 6b). Graph 68 illustrated the gain in the Y-Z plane (FIG. 6c). The Z axis is along the length of the substrate 32, the X axis is along the width, and the Y axis is along the thickness. The gain is about 5.1 dB at the frequency of 7.3 GHz.

Moreover, based upon the relatively small size of the antenna assembly 40, in other example embodiments, the antenna assembly 40 may be carried by a flexible substrate (not shown). The flexible substrate may be included with the substrate 32, for example, for carrying other components or circuitry, for example, the display 60, the wireless communications circuitry 33, and the satellite positioning signal receiver 34. The flexible substrate may advantageously allow for conforming of the antenna assembly 40 with the back of the portable housing 31. The flexible substrate may include an adhesive layer (not shown), for example, a pressure sensitive adhesive, on an underside thereof for mounting. A copper layer (not shown) may be carried on a front side of the flexible substrate.

Figure 7:
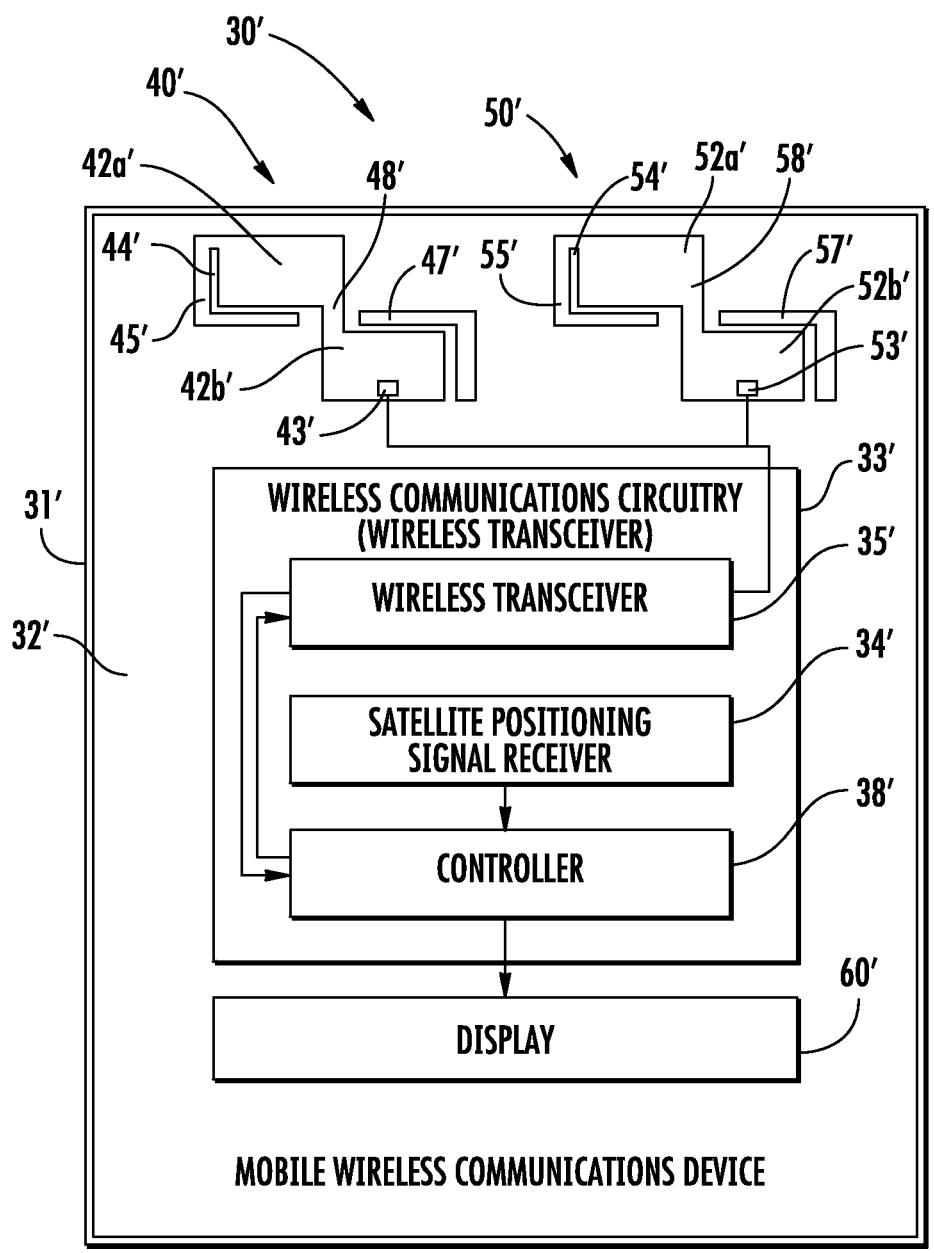
FIG. 7 is a schematic block diagram of a device according to another example embodiment.

Referring now to FIG. 7, in another example embodiment, the mobile wireless communications device 30' includes two antenna assemblies 40', 50'. Each antenna assembly 40', 50' is spaced apart and carried at the top portion of the portable housing 31'. Of course, each antenna assembly 40', 50' may be carried by a different portion of the portable housing 31'. The first and second antenna assemblies 40', 50' are illustratively similar to the antenna assembly 40 described above and illustrated in FIG. 2, for example. The second antenna assembly 50' is also illustratively the same as the first antenna assembly 40' in that it includes an electrically conductive base conductor 51' including first an second rectangular base portions 52a', 52b' coupled at respective diagonally opposing corners thereof 58', an antenna feed 53' defined in the second rectangular base portion, and first and second L-shaped conductive arms 55', 57', extending along the first and second rectangular base portions, respectively, and in the same configuration. Of course, the first and second antenna assemblies 40', 50' may have different configurations and have more or less components relative to one another.

In addition to spatial diversity, as noted above, polarization diversity may also be accomplished by using the two antenna assemblies 40', 50'. More particularly, polarization diversity may be achieved by rotating one of the first and second antenna assemblies 40', 50' 180 degrees, and feeding that antenna assembly from the respective first rectangular base portion 42a', 52a'. The relatively small size of each antenna assembly 40', 50' may make it particularly advantageous in multiple-input and multiple-output (MIMO) systems, for example.

A method aspect is directed to a method of making a mobile wireless communications device 30 that may include a portable housing 31, a substrate 32 carried by the portable housing, and wireless communications circuitry 33 carried by the substrate. The method includes forming an antenna assembly 40 on the substrate 32 and coupled to the wireless communications circuitry 33. Forming the antenna assembly 40 includes forming an electrically conductive base conductor 41 comprising a first rectangular base portion 42a and a second rectangular base portion 42b offset therefrom. The first and second base portions 42 are coupled at respective diagonally opposing corners thereof and have an antenna feed 43 defined on one of the first and second base portions 42. Forming the antenna assembly 40 also includes forming an electrically conductive arm 45, 47 extending along at least one side of one of the first and second rectangular base portions 42 and spaced apart therefrom.

Figure 8:
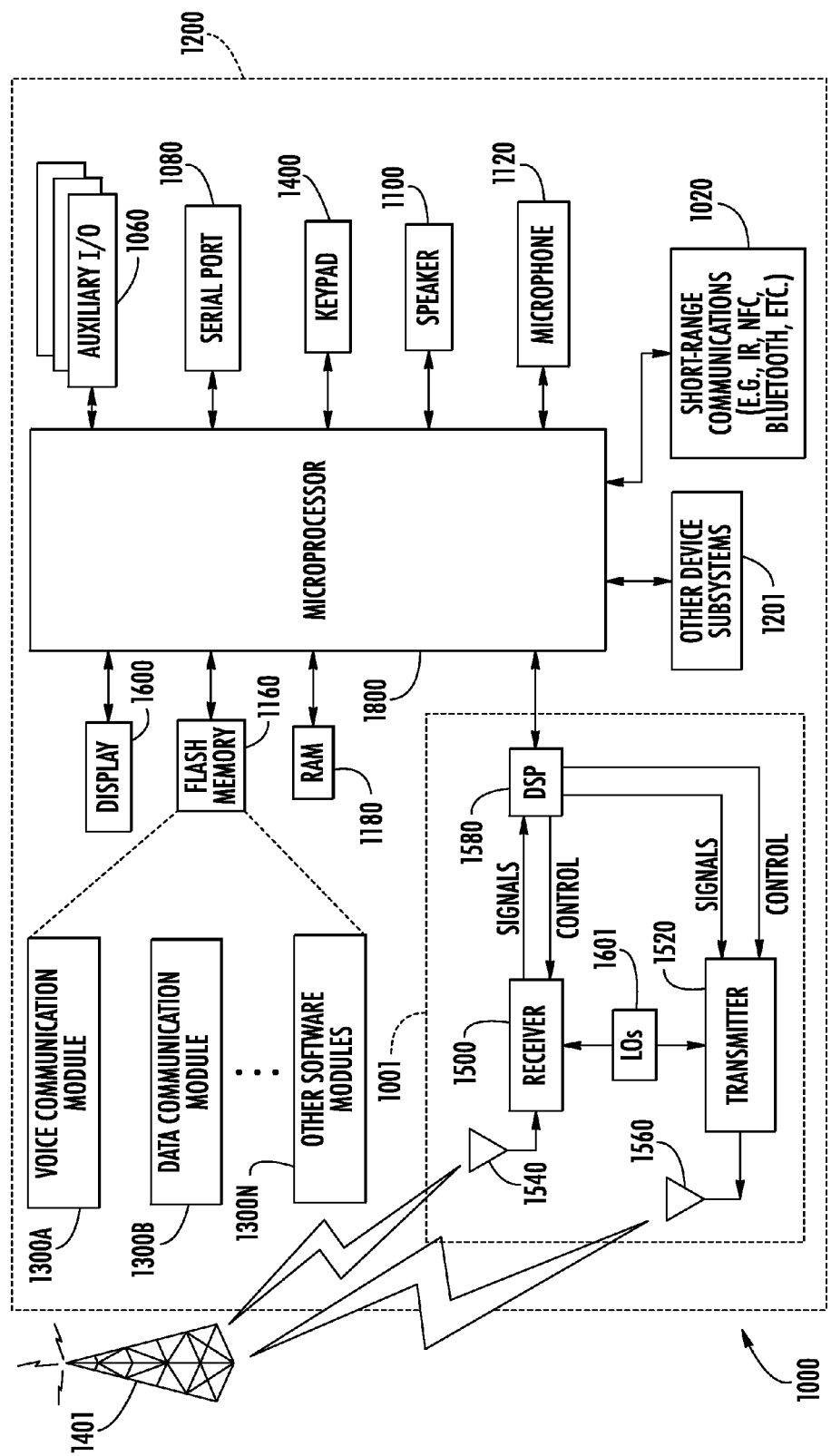
FIG. 8 is a schematic block diagram illustrating in more detail components that may be included in the mobile wireless communications device of FIG. 1.

Example components of a mobile wireless communications device 1000 that may be used in accordance with the above-described embodiments are further described below with reference to FIG. 8. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. B. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   wireless communications circuitry; and
   at least one antenna assembly coupled to said wireless communications circuitry, and comprising
   an electrically conductive base comprising a first rectangular base portion and a second rectangular base portion being coupled at respective diagonally opposing corners thereof, and
   at least one electrically conductive arm extending along at least one side of one of said first and second rectangular base portions and spaced apart therefrom.

2. The electronic device according to claim 1, wherein said at least one electrically conductive arm comprises an L-shaped conductive arm.

3. The electronic device according to claim 1, wherein said at least one electrically conductive arm is coupled to at least one of said first and second rectangular base portions.

4. The electronic device according to claim 1, wherein said at least one electrically conductive arm comprises at least one electrically floating conductive arm.

5. The electronic device according to claim 1, wherein said at least one electrically conductive arm comprises first and second electrically conductive arms adjacent said first and second rectangular base portions, respectively.

6. The electronic device according to claim 1, wherein said at least one electrically conductive arm extends along at least two sides of an adjacent one of said first and second rectangular base portions.

7. The electronic device according to claim 1, wherein said at least one antenna assembly further comprises a substrate supporting said first and second rectangular base portions and said at least one electrically conductive arm.

8. The electronic device according to claim 1, wherein said at least one antenna assembly comprises a plurality of spaced apart antenna assemblies.

9. An electronic device comprising:
    wireless communications circuitry; and
    at least one antenna assembly coupled to said wireless communications circuitry, and comprising
        an electrically conductive base conductor comprising a first rectangular base portion and a second rectangular base portion coupled at respective diagonally opposing corners thereof, and
        at least one L-shaped electrically conductive arm extending along at least two sides of an adjacent one of said first and second rectangular base portions and spaced apart therefrom.

10. The electronic device according to claim 9, wherein said at least one L-shaped electrically conductive arm is coupled to at least one of said first and second rectangular base portions.

11. The electronic device according to claim 9, wherein said at least one L-shaped electrically conductive arm comprises at least one L-shaped electrically floating conductive arm.

12. The electronic device according to claim 9, wherein said at least one L-shaped electrically conductive arm comprises first and second electrically conductive arms adjacent said first and second rectangular base portions, respectively.

13. The electronic device according to claim 9, wherein said at least one antenna assembly comprises a substrate supporting said first and second rectangular portions and said at least one L-shaped arm.

14. A method of making at least one antenna assembly to be coupled to wireless communications circuitry of an electronic device, the method comprising:
    forming an electrically conductive base conductor comprising a first rectangular base portion and a second rectangular base portion being coupled at respective diagonally opposing corners thereof; and
    forming at least one electrically conductive arm extending along at least one side of one of the first and second rectangular base portions and spaced apart therefrom.

15. The method according to claim 14, wherein forming the at least one electrically conductive arm comprises forming an L-shaped conductive arm.

16. The method according to claim 14, wherein forming the at least one electrically conductive arm comprises forming the at least one electrically conductive arm to be coupled to at least one of the first and second rectangular base portions.

17. The method according to claim 14, wherein forming the at least one electrically conductive arm comprises forming at least one electrically floating conductive arm.

18. The method according to claim 14, wherein forming the at least one electrically conductive arm comprises forming first and second conductive arms adjacent the first and second rectangular base portions, respectively.

19. The method according to claim 14, wherein forming at least one electrically conductive arm comprises forming the at least one electrically conductive arm to extend along at least two sides of an adjacent one of the first and second rectangular base portions.

* * * * *